(12) United States Patent
Mo et al.

(10) Patent No.: US 12,269,417 B1
(45) Date of Patent: Apr. 8, 2025

(54) REAR SEAT BELT ANCHORAGE STRUCTURE FOR VEHICLE

(71) Applicants: Hyundai Motor Company, Seoul (KR); Kia Corporation, Seoul (KR)

(72) Inventors: Jinyoung Mo, Hwaseong-si (KR); Haehoon Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/779,534

(22) Filed: Jul. 22, 2024

(30) Foreign Application Priority Data

Dec. 12, 2023 (KR) .................. 10-2023-0179659

(51) Int. Cl.
*B60R 22/24* (2006.01)
*B60N 2/015* (2006.01)
*B60S 1/04* (2006.01)
*B62D 25/04* (2006.01)
*B62D 25/08* (2006.01)

(52) U.S. Cl.
CPC ............ *B60R 22/24* (2013.01); *B60N 2/015* (2013.01); *B60S 1/043* (2013.01); *B62D 25/04* (2013.01); *B62D 25/08* (2013.01)

(58) Field of Classification Search
CPC ... B60R 22/18; B60R 22/195; B60R 22/1951; B60R 22/24; B60R 2022/3402; B62D 25/04; B62D 25/08; B60N 2/015; B60S 1/043
See application file for complete search history.

(56) References Cited

U.S. PATENT DOCUMENTS

| 6,293,588 | B1 * | 9/2001 | Clune ............... B60R 22/02 297/483 |
| 7,658,444 | B2 * | 2/2010 | Murphy ............ B60N 2/2806 297/472 |
| 10,272,750 | B2 * | 4/2019 | Costa .................. B60S 1/52 |
| 11,285,912 | B2 * | 3/2022 | Okamoto .......... B60R 22/24 |
| 11,548,472 | B2 * | 1/2023 | Tchepikov ........ B60R 22/26 |
| 11,572,032 | B2 * | 2/2023 | Kobori .............. B60R 22/24 |

FOREIGN PATENT DOCUMENTS

| JP | 02151548 | A | * | 6/1990 |
| JP | 2006256351 | A | * | 9/2006 |
| JP | 6083255 | B2 | | 2/2017 |
| JP | 2022166896 | A | | 11/2022 |
| KR | 102474386 | B1 | | 12/2022 |

* cited by examiner

*Primary Examiner* — Laura Freedman
(74) *Attorney, Agent, or Firm* — Slater Matsil, LLP

(57) ABSTRACT

An embodiment rear seat belt anchorage structure for a vehicle includes a rear cross member including a front cross member upper panel at a rear side of a rear seat and extending in a width direction, a front cross member lower panel coupled to a lower portion of the front cross member upper panel, and a rear cross member panel coupling the front cross member upper panel and a rear end of the front cross member lower panel in a height direction, a rear seat belt retractor mounting bracket on an upper surface of the front cross member upper panel and defining an opening through which a webbing of a rear seat belt extends, and a rear seatback mounting bracket on the front cross member upper panel and a front end of the front cross member lower panel and protruding toward the rear seat.

20 Claims, 13 Drawing Sheets

REAR SEAT BELT ANCHORAGE STRUCTURE FOR VEHICLE

CROSS-REFERENCE TO RELATED APPLICATIONS

This application claims the benefit of Korean Patent Application No. 10-2023-0179659, filed on Dec. 12, 2023, which application is hereby incorporated herein by reference.

TECHNICAL FIELD

The present disclosure relates to a rear seat belt anchorage structure for a vehicle.

BACKGROUND

In general, a seat belt of a vehicle refers to a device that serves to fix a position of an occupant as securely as possible while the vehicle travels. The seat belt is mounted to reduce a secondary injury caused by an impact force in the event of a collision or the like.

A seat belt, which is mounted in a rear seat of the vehicle, includes a seat belt webbing having a predetermined length and wound around a retractor on a rear cross member corresponding to a position of a backrest of the rear seat, and the seat belt webbing may be extended. The retractor has a structure capable of detecting an extension acceleration of the seat belt webbing and restricting the extension of the seat belt webbing.

In a seat belt device of the vehicle, the rear cross member needs to be strong enough to withstand a load applied by the seat belt webbing. In case that the retractor is merely mounted on the rear cross member, there is a risk that a cross-section of the rear cross member is distorted, and a rear glass attached to the rear cross member is damaged.

Accordingly, there is a need for a rear seat belt anchorage structure capable of satisfying component durability and collision performance of a tailgate opening portion of the vehicle.

SUMMARY

The present disclosure relates to a rear seat belt anchorage structure for a vehicle. Particular embodiments relate to a rear seat belt anchorage structure capable of dispersing a load of a rear cross member during a process of fastening a seat belt to a rear seat retractor mount installed at a rear seat side of a vehicle.

Embodiments of the present disclosure provide a rear seat belt anchorage structure for a vehicle, in which a rear seatback mounting bracket, which is shaped to protrude toward a rear seat, is provided on a rear cross member panel of a vehicle, which may ensure durability of a rear seat belt retractor mounted on the rear cross member panel and ensure collision performance of a rear opening portion.

An exemplary embodiment of the present disclosure provides a rear seat belt anchorage structure for a vehicle, which constitutes a rear cross member installed at a rear side of a rear seat at a rear side of a vehicle and has a retractor in which a rear seat belt is mounted, the rear seat belt anchorage structure including a front cross member upper panel formed at the rear side of the rear seat at the rear side of the vehicle and extending in a direction perpendicular to a longitudinal direction of the vehicle, a front cross member lower panel coupled to a lower portion of the front cross member upper panel, a rear cross member panel configured to constitute a rear cross member by connecting and coupling the front cross member upper panel and a rear end of the front cross member lower panel in a height direction of the vehicle, a rear seat belt retractor mounting bracket mounted on an upper surface of the front cross member upper panel and configured to define an opening through which a webbing of the rear seat belt is extended, and at least one rear seatback mounting bracket provided on the front cross member upper panel and a front end of the front cross member lower panel and shaped to protrude toward the rear seat.

Side extension panels may be further provided at two opposite ends of the rear cross member panel and connected to pillars of the vehicle body.

Quarter inner panels may be further provided at two opposite ends of the front cross member lower panel, connected to the side extension panel, and connected to the pillars of the vehicle body.

The rear cross member may be further provided with a reinforcement configured to improve strength of the rear cross member, a rear wiper mounting bracket configured to fix a wiper for a rear glass, and a tailgate latch-striker mounting bracket to which a tailgate fixing latch and a striker of the vehicle are fixed.

The rear seatback mounting bracket may be formed in a plate shape having an end bent upward.

The rear seatback mounting bracket may be formed in a shape having a width that gradually decreases toward the rear seat.

An upper portion of the rear seatback mounting bracket may be formed in a shape covered by a bulkhead.

A rear seatback mounting protrusion may be provided at a front end of the rear seatback mounting bracket, and the rear seat may be fixed to and supported on the rear seatback mounting protrusion.

The rear seat belt retractor mounting bracket may be inserted into the opening, welded to an inner surface of the rear cross member panel and an inner surface of the front cross member upper panel, and welded to an upper surface of the front cross member upper panel outside the opening.

A reinforcement bracket may be further provided on the seat belt retractor mounting bracket, may be configured to connect two opposite ends of the seat belt retractor mounting bracket, and may have an opening through which the webbing of the rear seat belt is extended.

Seat belt pretensioners may be further provided at two opposite sides of the seat belt retractor mounting bracket and interposed between the front cross member upper panel and the reinforcement bracket.

The seat belt retractor mounting bracket may be provided as a plurality of seat belt retractor mounting brackets, may be provided at positions between the rear seatback mounting brackets, and may be symmetrically mounted on an upper surface of the front cross member upper panel.

According to the embodiments of the present disclosure, the rear cross member of the vehicle and organic welding of the body-in-white (BIW) may reduce the area of the rear opening portion and improve the durability of the BIW.

In addition, the rear seat belt retractor mounting bracket is mounted by welding in the opening through which the webbing of the rear seat is extended, which may reinforce the strength of the webbing extension opening.

In addition, at least one rear seatback mounting bracket is provided on the rear cross member and protrudes toward the rear seat, such that the 'W'-shaped load dispersion structure may be implemented, which may reinforce the test strength of the seat belt anchorage.

DETAILED DESCRIPTION OF ILLUSTRATIVE EMBODIMENTS

Figure 1:
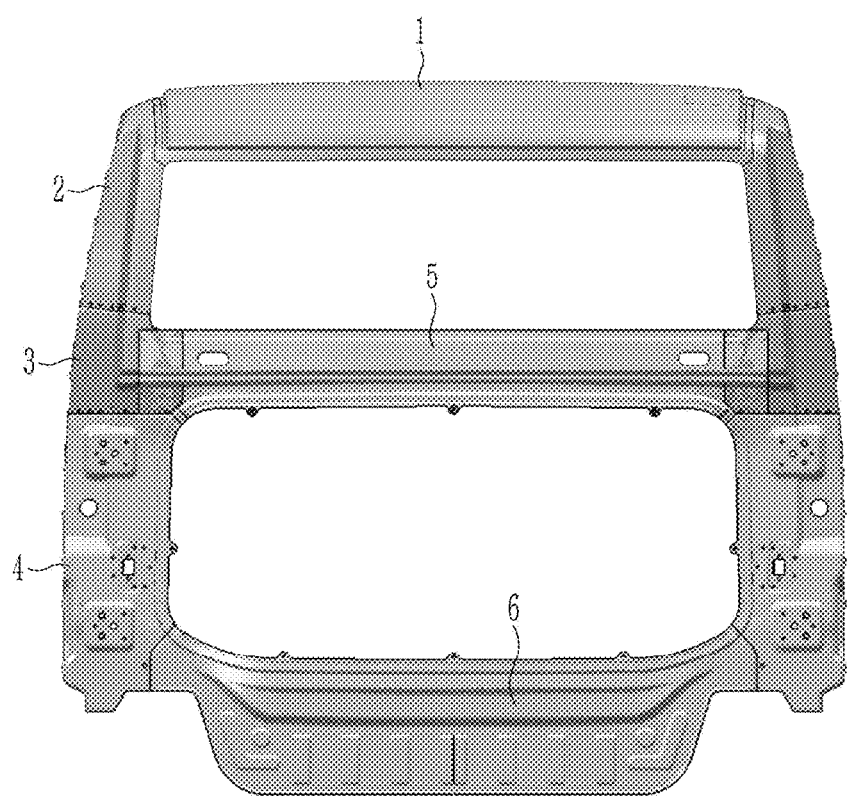
FIG. 1 is a top plan view illustrating a rear opening portion of a vehicle to which a rear seat belt anchorage structure according to an embodiment of the present disclosure is applied.

Hereinafter, embodiments of the present disclosure will be described in detail with reference to the accompanying drawings so that those with ordinary skill in the art to which the present disclosure pertains may easily carry out the embodiments. The present disclosure may be implemented in various different ways and is not limited to the embodiments described herein.

In addition, the constituent elements having the same configurations in several embodiments will be assigned with the same reference numerals and described only in the representative embodiment, and only the constituent elements, which are different from the constituent elements according to the representative embodiment, will be described in other embodiments.

It is noted that the drawings are schematic and are not illustrated based on actual scales. Relative dimensions and proportions of parts illustrated in the drawings are exaggerated or reduced in size for the purpose of clarity and convenience in the drawings, and any dimension is just illustrative but not restrictive. Further, the same reference numerals designate the same structures, elements, or components illustrated in two or more drawings in order to exhibit similar characteristics. When one component is described as being positioned "above" or "on" another component, one component can be positioned "directly on" another component, and one component can also be positioned on another component with other components interposed therebetween.

The embodiments of the present disclosure specifically illustrate examples of the present disclosure. As a result, various modifications of the drawings are expected. Therefore, the embodiments are not limited to specific forms in regions illustrated in the drawings, and for example, include modifications of forms by the manufacture thereof.

Hereinafter, a rear seat belt anchorage structure 100 for a vehicle according to embodiments of the present disclosure will be described in detail with reference to the accompanying drawings.

Figure 2:
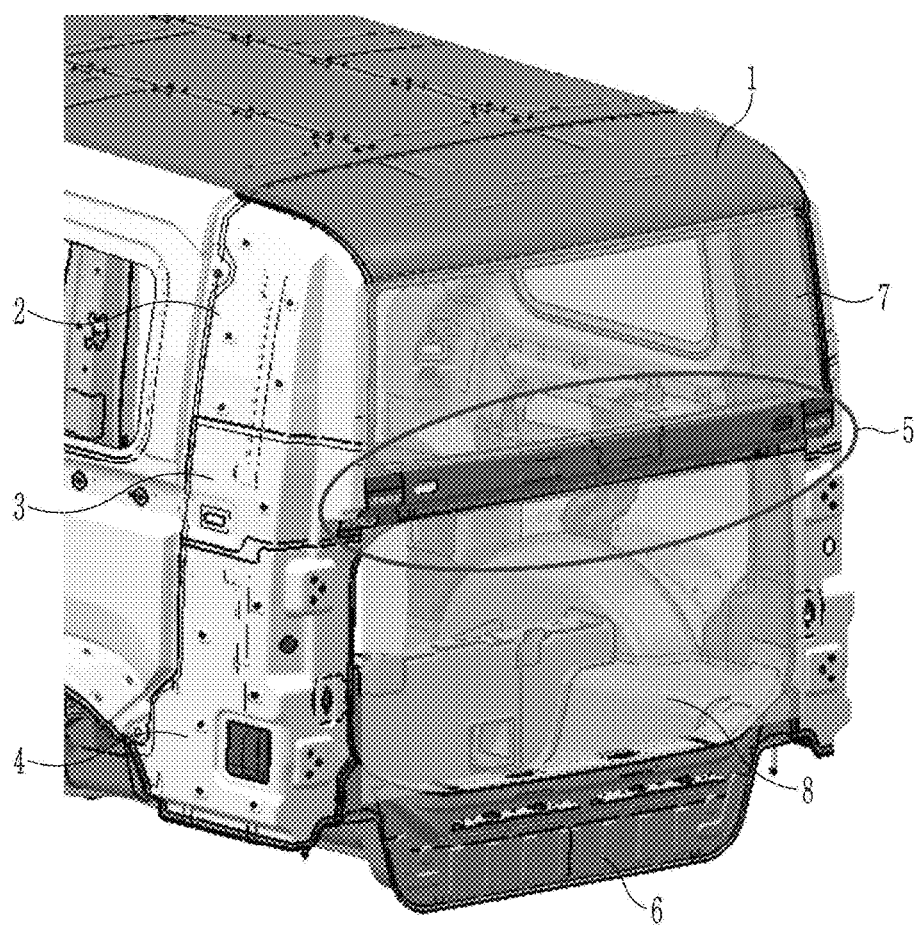
FIG. 2 is a perspective view illustrating the rear opening portion of the vehicle to which the rear seat belt anchorage structure according to an embodiment of the present disclosure is applied.

FIG. 1 is a top plan view illustrating a rear opening portion of a vehicle to which the rear seat belt anchorage structure according to an embodiment of the present disclosure is applied, and FIG. 2 is a perspective view illustrating the rear opening portion of the vehicle to which the rear seat belt anchorage structure according to an embodiment of the present disclosure is applied.

With reference to FIGS. 1 and 2, the rear seat belt anchorage structure 100 for a vehicle according to the embodiment of the present disclosure constitutes a rear cross member 5 installed at a rear side of a rear seat at a rear side of a vehicle and includes a retractor in which a rear seat belt is mounted.

As illustrated in FIG. 1, the rear opening portion of the vehicle includes openings defined by a roof panel 1 at the rear side of the vehicle, side extension upper panels 2 connected to two opposite sides of the roof panel 1 and extending toward a lower side of the vehicle, side extension center panels 3 and side extension lower panels 4 connected to lower portions of the side extension upper panels 2 and extending toward the lower side of the vehicle, and a back panel 6 connected to lower portions of the side extension lower panels 4 at the two opposite sides and extending in a horizontal direction of the vehicle. The rear cross member 5 is installed in the rear opening portion of the vehicle, is configured to connect the side extension lower panels 4 at the two opposite sides, and extends in the horizontal direction of the vehicle.

As illustrated in FIG. 2, a rear glass 7 is mounted in the opening between the rear cross member 5 and the roof panel 1, and a luggage space 8, in which a tailgate may be mounted, is formed in the opening between the rear cross member 5 and the back panel 6.

The rear seat belt anchorage structure 100 for a vehicle according to an embodiment of the present disclosure may be installed at a vehicle inner side of the rear cross member 5, i.e., a portion directed toward the rear seat in a vehicle interior.

Figure 3A:
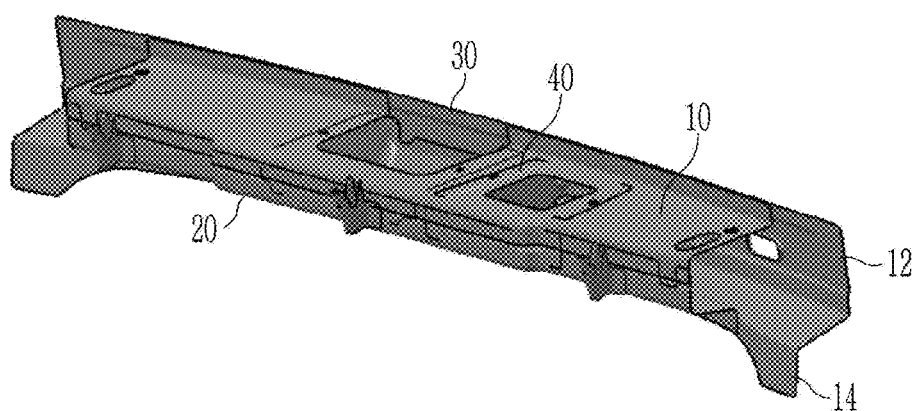
FIGS. 3A and 3B are views illustrating an example of the rear seat belt anchorage structure for a vehicle in accordance with a body type of the vehicle.
Figure 3B:
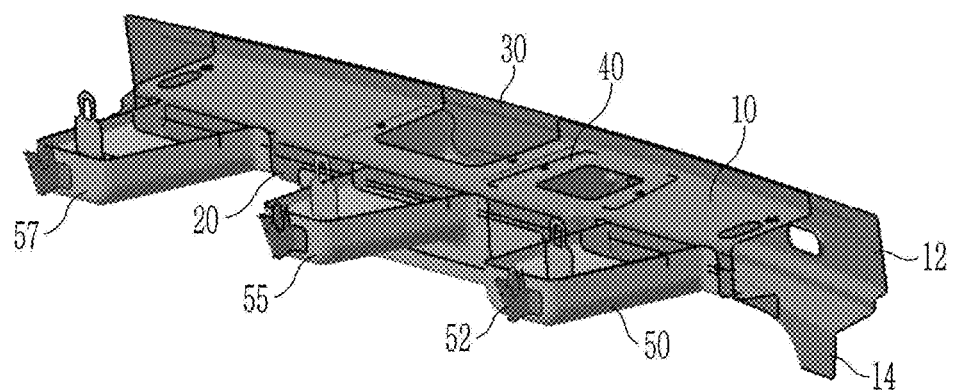
Figure 4:
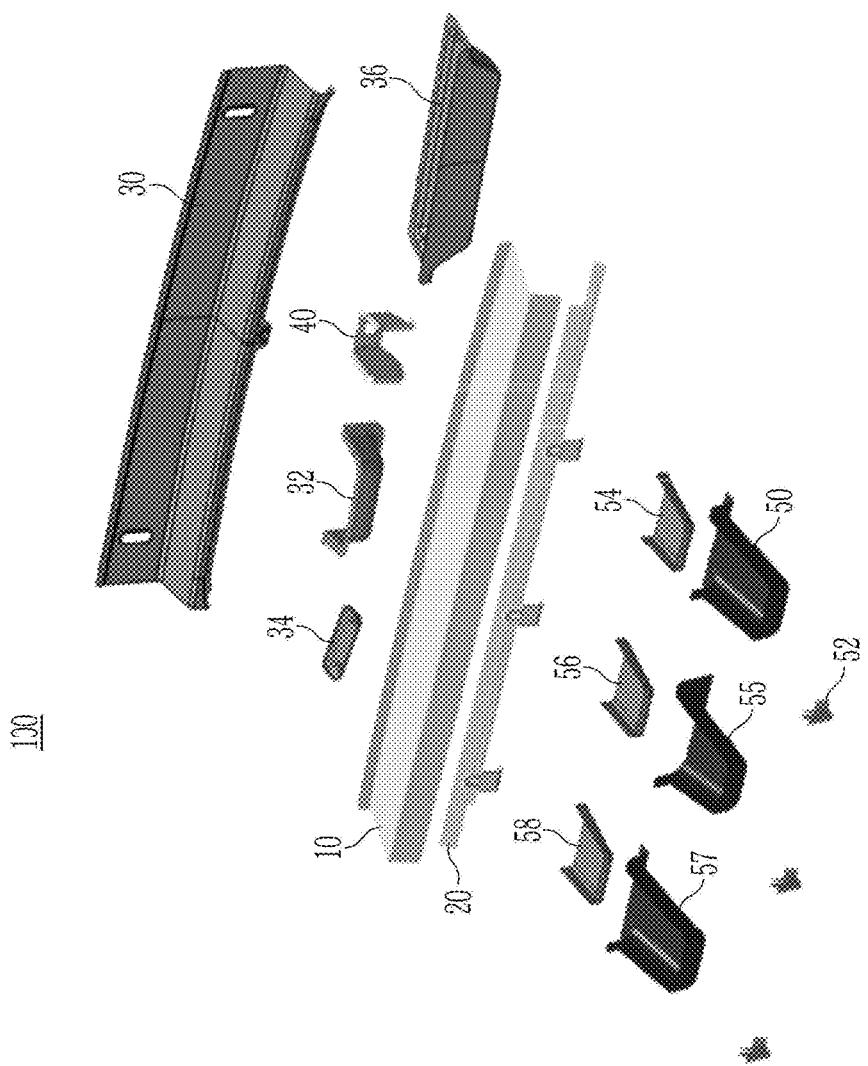
FIG. 4 is an exploded perspective view illustrating the rear seat belt anchorage structure according to an embodiment of the present disclosure.

FIGS. 3A and 3B are views illustrating an example of the rear seat belt anchorage structure for a vehicle in accordance with a body type of the vehicle, and FIG. 4 is an exploded perspective view illustrating the rear seat belt anchorage structure according to an embodiment of the present disclosure.

With reference to FIGS. 3A and 3B, the rear seat belt anchorage structure 100 for a vehicle may be dualized and installed in accordance with the body type of the vehicle. The structure of the rear seat belt anchorage structure 100 illustrated in FIG. 3B differs from the structure in FIG. 3A in that a plurality of rear seatback mounting brackets 50, 55, and 57 is shaped to protrude toward the rear seat. Therefore, the structure in FIG. 3B may be applied to a vehicle in which a specification length of a rear portion of the vehicle is long.

Figure 5:
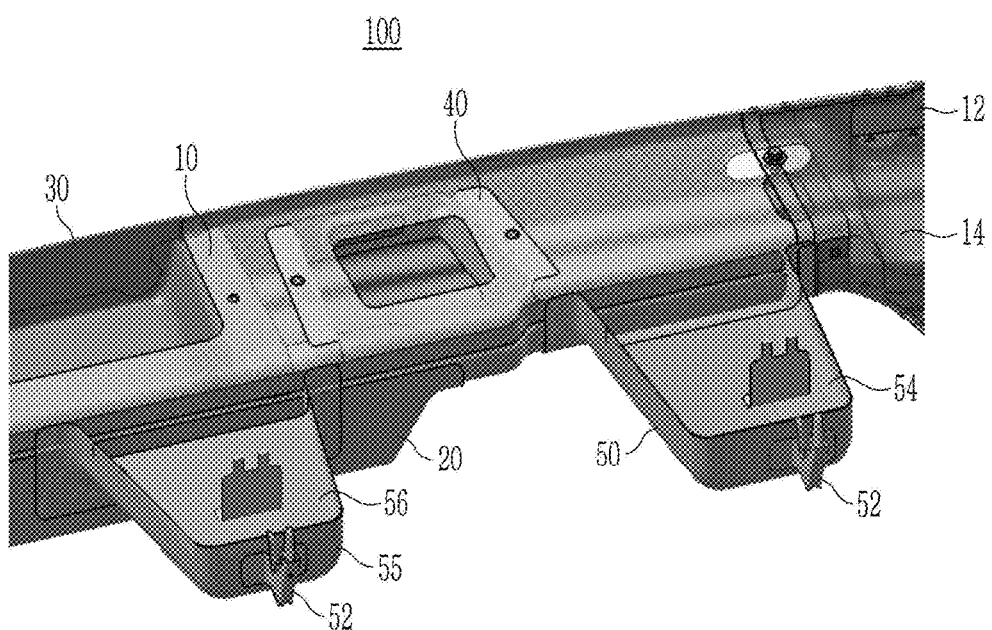
FIG. 5 is an enlarged view illustrating a part of the rear seat belt anchorage structure according to an embodiment of the present disclosure.

FIG. 4 is an exploded perspective view illustrating the rear seat belt anchorage structure according to an embodiment of the present disclosure, and FIG. 5 is an enlarged view illustrating a part of the rear seat belt anchorage structure according to an embodiment of the present disclosure.

With reference to FIGS. 3A to 5, the rear seat belt anchorage structure 100 according to an embodiment of the present disclosure includes a front cross member upper panel 10, a front cross member lower panel 20, a rear cross member panel 30, a rear seat belt retractor mounting bracket 40, and the rear seatback mounting brackets 50, 55, and 57.

The front cross member upper panel 10 is provided at the rear side of the rear seat at the rear side of the vehicle and extends in a direction perpendicular to a longitudinal direction of the vehicle. Front and rear ends of the front cross member upper panel 10 may be formed to be bent, and the front cross member lower panel 20 and the rear cross member panel 30 may be respectively attached and coupled to the front and rear ends of the front cross member upper panel 10.

The front cross member lower panel 20 may be coupled to a lower portion of a front end of the front cross member upper panel 10 and extend in the direction perpendicular to the longitudinal direction of the vehicle so as to be parallel to an extension direction of the front cross member upper panel 10. Front and rear ends of the front cross member lower panel 20 may be formed to be bent.

The rear cross member panel 30 may connect and couple the rear end of the front cross member upper panel 10 and the rear end of the front cross member lower panel 20 in a height direction of the vehicle and extend in the direction perpendicular to the longitudinal direction of the vehicle so as to be parallel to the extension direction of the front cross member upper panel 10 and the front cross member lower panel 20.

The rear cross member panel 30 couples the front cross member upper panel 10 and the front cross member lower panel 20 together, thereby constituting the rear cross member 5 of the vehicle.

The rear seat belt retractor mounting bracket 40 may be mounted on an upper surface of the front cross member upper panel 10 and have an opening through which a webbing 45 of the rear seat belt is extended. That is, the rear seat belt retractor mounting bracket 40 may be mounted around the opening into which the webbing 45 of the rear seat belt (see FIG. 8) is inserted.

The rear seatback mounting brackets 50, 55, and 57 may be provided in case that the specifications length of the rear portion of the vehicle is long. The rear seatback mounting brackets 50, 55, and 57 may be mounted at the front end of the front cross member upper panel 10 and the front end of the front cross member lower panel 20 and shaped to protrude toward the rear seat. The rear seatback mounting brackets 50, 55, and 57 may be provided as a plurality of rear seatback mounting brackets 50, 55, and 57.

Meanwhile, side extension panels 12 may be further provided at two opposite ends of the rear cross member panel 30 and connected to pillars of a vehicle body. In addition, quarter inner panels 14 may be further provided at two opposite ends of the front cross member lower panel 20 and connected to the side extension panels 12 and the pillars of the vehicle body.

The side extension panels 12 and the quarter inner panels 14 may serve to further improve strength of the rear cross member 5 of the vehicle defined by coupling the front cross member upper panel 10, the front cross member lower panel 20, and the rear cross member panel 30.

Meanwhile, the rear cross member 5 may be further provided with a reinforcement 34 configured to improve strength of the rear cross member 5, a rear wiper mounting bracket 32 configured to fix a wiper for the rear glass, and a tailgate latch-striker mounting bracket 36 to which a tailgate fixing latch and a striker of the vehicle are fixed. In addition, various components for the rear cross member 5 may be mounted on the rear cross member 5, as necessary.

The rear seatback mounting brackets 50, 55, and 57 may each have a plate shape having an end bent upward. That is, one end of each of the rear seatback mounting brackets 50, 55, and 57 may be attached and coupled to the front end of the front cross member upper panel 10 and the front end of the front cross member lower panel 20, and the other three ends of the rear seatback mounting brackets 50, 55, and 57 may be shaped to be bent upward.

In addition, the rear seatback mounting brackets 50, 55, and 57 may each have a plate shape having a width that gradually decreases in a direction toward the rear seat. That is, when viewed from above the vehicle, the rear seatback mounting brackets 50, 55, and 57 may each have an approximately trapezoidal shape.

Upper portions of the rear seatback mounting brackets 50, 55, and 57 may be shaped to be covered by bulkheads 54, 56, and 58. The bulkheads 54, 56, and 58 are coupled to support inner sides of edges of the rear seatback mounting brackets 50, 55, and 57, thereby improving rigidity of the rear seatback mounting brackets 50, 55, and 57.

Meanwhile, rear seatback mounting protrusions 52 may be provided at outer sides of front ends of the rear seatback mounting brackets 50, 55, and 57, and the rear seat in the vehicle may be fixed to and supported on the rear seatback mounting protrusions 52.

With reference to FIG. 5, the rear seat belt retractor mounting bracket 40 may be coupled around an extension opening for the webbing 45 of the rear seat belt formed in an upper surface of the front cross member upper panel 10. In addition, the rear seat belt retractor mounting bracket 40 may be coupled and inserted into the opening.

Figure 6:
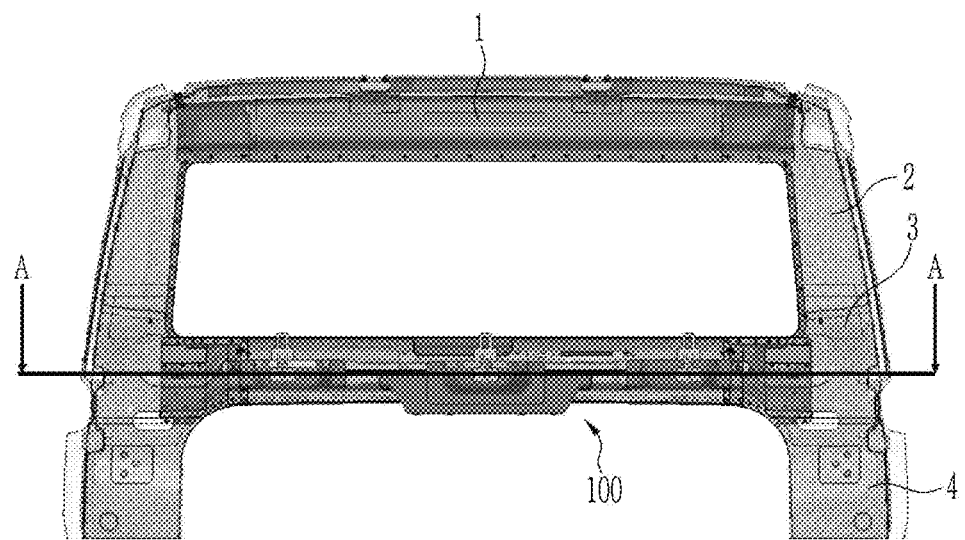
FIG. 6 is a top plan view illustrating a state in which the rear seat belt anchorage structure according to an embodiment of the present disclosure is applied to the rear opening portion of the vehicle.
Figure 7:
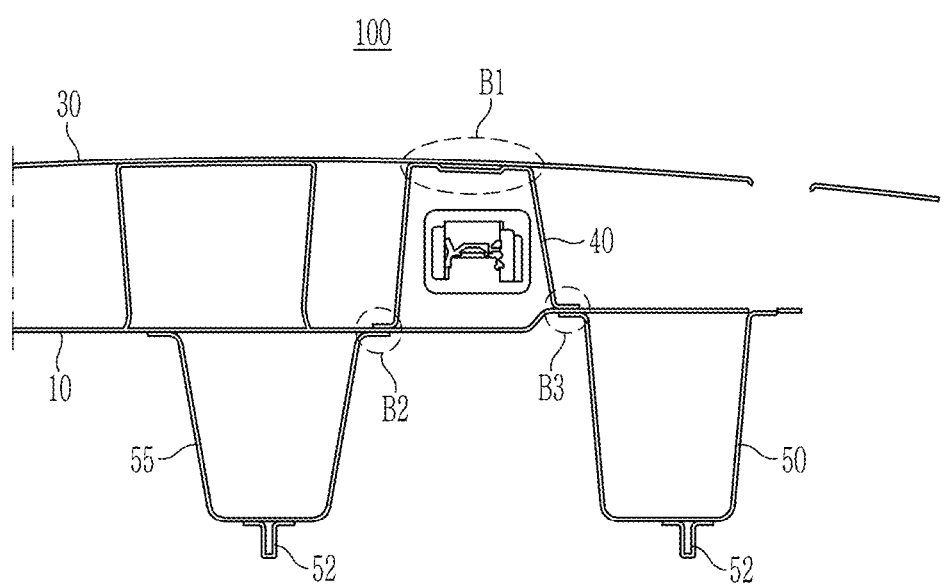
FIG. 7 is a cross-sectional view taken along line 'A-A' in FIG. 6.

FIG. 6 is a top plan view illustrating a state in which the rear seat belt anchorage structure according to an embodiment of the present disclosure is applied to the rear opening portion of the vehicle, and FIG. 7 is a cross-sectional view taken along line 'A-A' in FIG. 6.

With reference to FIGS. 6 and 7, the rear seat belt retractor mounting bracket 40 may be inserted into the opening and coupled to an inner surface of the rear cross member panel 30 by welding (point B1). In addition, the rear seat belt retractor mounting bracket 40 may be coupled to an inner surface of the front cross member upper panel 10 by welding (points B2 and B3).

As illustrated in FIG. 5 above, the rear seat belt retractor mounting bracket 40 may be provided outside the opening and coupled to an upper surface of the front cross member upper panel 10 by welding.

In addition, the rear seat belt retractor mounting bracket 40 may be disposed in an internal space of the rear cross member 5 and provided at a position provided between the plurality of rear seatback mounting brackets 50, 55, and 57 without overlapping the plurality of rear seatback mounting brackets 50, 55, and 57.

Figure 8:
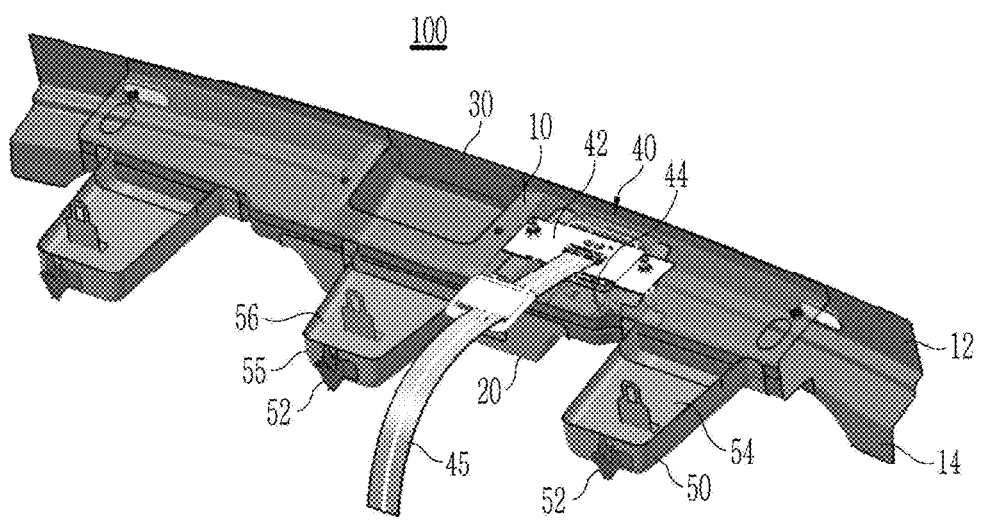
FIG. 8 is a perspective view illustrating a state in which a webbing of a rear seat belt is mounted on the rear seat belt anchorage structure according to an embodiment of the present disclosure.
Figure 9:
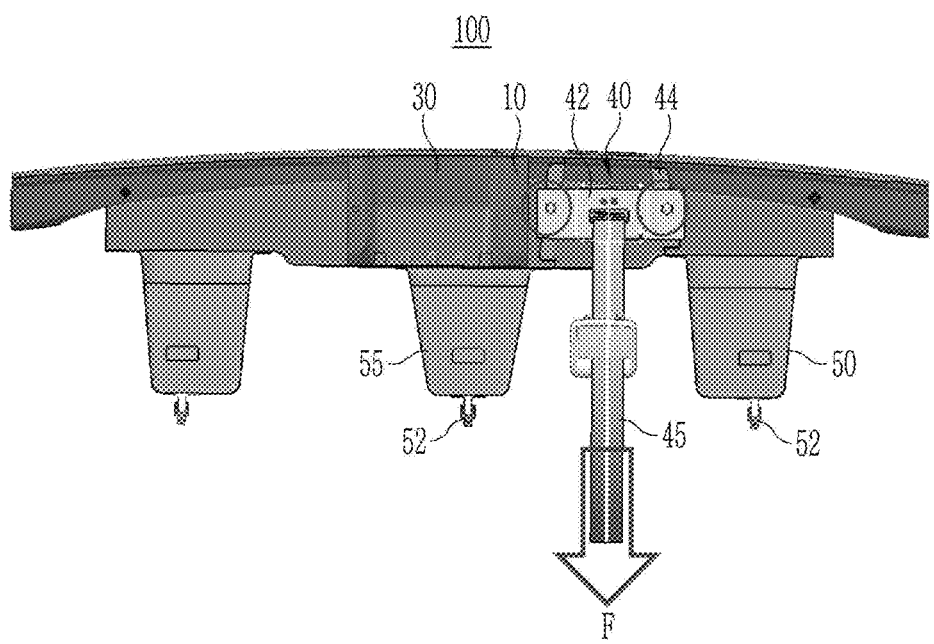
FIG. 9 is a top plan view illustrating a state in which the webbing of the rear seat belt is mounted on the rear seat belt anchorage structure according to an embodiment of the present disclosure.

FIG. 8 is a perspective view illustrating a state in which the webbing of the rear seat belt is mounted on the rear seat belt anchorage structure according to an embodiment of the present disclosure, and FIG. 9 is a top plan view illustrating a state in which the webbing of the rear seat belt is mounted on the rear seat belt anchorage structure according to an embodiment of the present disclosure.

With reference to FIGS. 8 and 9, the webbing 45 of the rear seat belt is inserted or extended through the opening of the upper surface of the front cross member upper panel 10, and the rear seat belt retractor mounting bracket 40 is mounted in the opening.

The rear seat belt retractor mounting bracket 40 may be further provided with a reinforcement bracket 42 configured to connect the two opposite ends of the rear seat belt retractor mounting bracket 40 and having an opening through which the webbing 45 of the rear seat belt is extended. That is, the opening formed in the upper surface of the front cross member upper panel 10 and the opening formed in the reinforcement bracket 42 may communicate with each other, such that the webbing 45 of the rear seat belt may pass through the openings. The reinforcement bracket 42 may fix the rear seat belt retractor mounting bracket 40 and improve the rigidity.

In addition, seat belt pretensioners 44 may be further provided at two opposite sides of the rear seat belt retractor mounting bracket 40 and interposed between the front cross member upper panel 10 and the reinforcement bracket 42. When rapid braking or impact is detected by a sensor, the seat belt pretensioners 44 may tighten the rear seat belt and fix a passenger to the rear seat, thereby preventing the passenger's body from falling forward.

Figure 10:
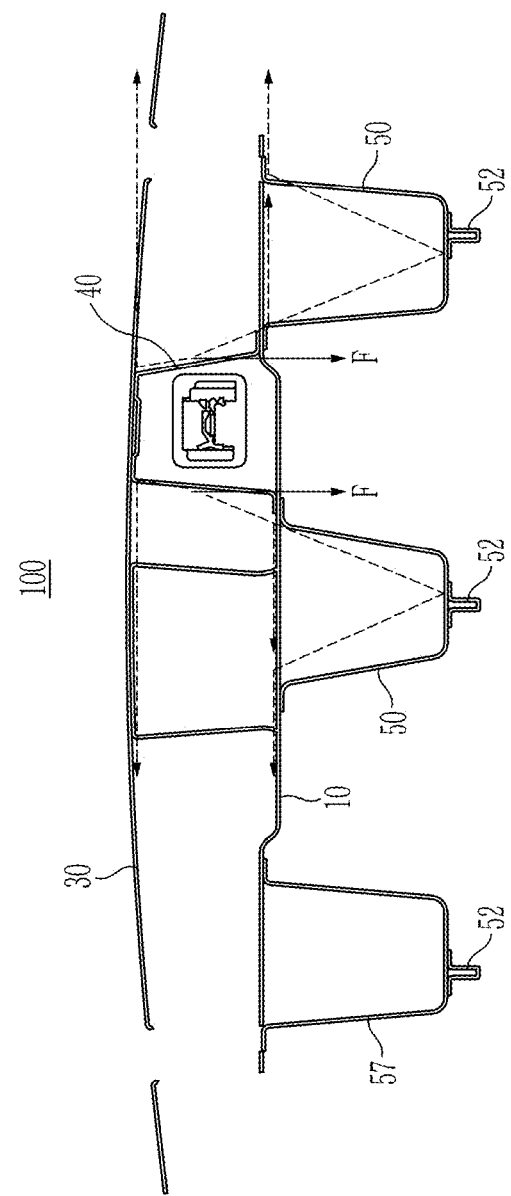
FIG. 10 is a cross-sectional view illustrating a state when viewed from above the rear seat belt anchorage structure according to an embodiment of the present disclosure.

FIG. 10 is a cross-sectional view illustrating a state when viewed from above the rear seat belt anchorage structure according to an embodiment of the present disclosure.

As illustrated in FIG. 10, the rear seat belt retractor mounting bracket 40 may be disposed in the internal space of the rear cross member 5 and provided at the position provided between the plurality of rear seatback mounting brackets 50, 55, and 57 without overlapping the plurality of rear seatback mounting brackets 50, 55, and 57. Therefore, a force F, which is applied when the webbing 45 of the rear seat belt is pulled toward the rear seat, is transmitted to the two opposite sides along the inner surface of the rear cross member panel 30 and transmitted to the two opposite sides along the inner surface of the front cross member upper panel 10. In addition, a triangular support load is formed in the rear seatback mounting brackets 50, 55, and 57 through connection portions between the front cross member upper panel 10 and the rear seatback mounting brackets 50, 55, and 57 and transmitted along an outer side of the front cross member upper panel 10.

As described above, the rear seat belt retractor mounting bracket 40 and the rear seatback mounting brackets 50, 55, and 57 are provided on the rear cross member 5, and a 'W'-shaped load dispersion path is formed, which may disperse and mitigate a load applied by pressure of the webbing 45 of the rear seat belt and reinforce test strength of the rear seat belt anchorage structure 100.

Figure 11:
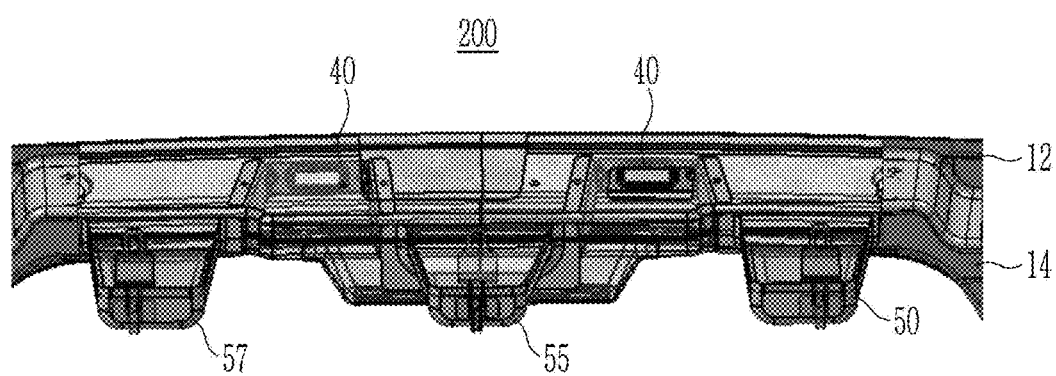
FIG. 11 is a view illustrating a state in which a rear seat belt anchorage structure according to another embodiment of the present disclosure is provided as a plurality of rear seat belt anchorage structures.
Figure 12:
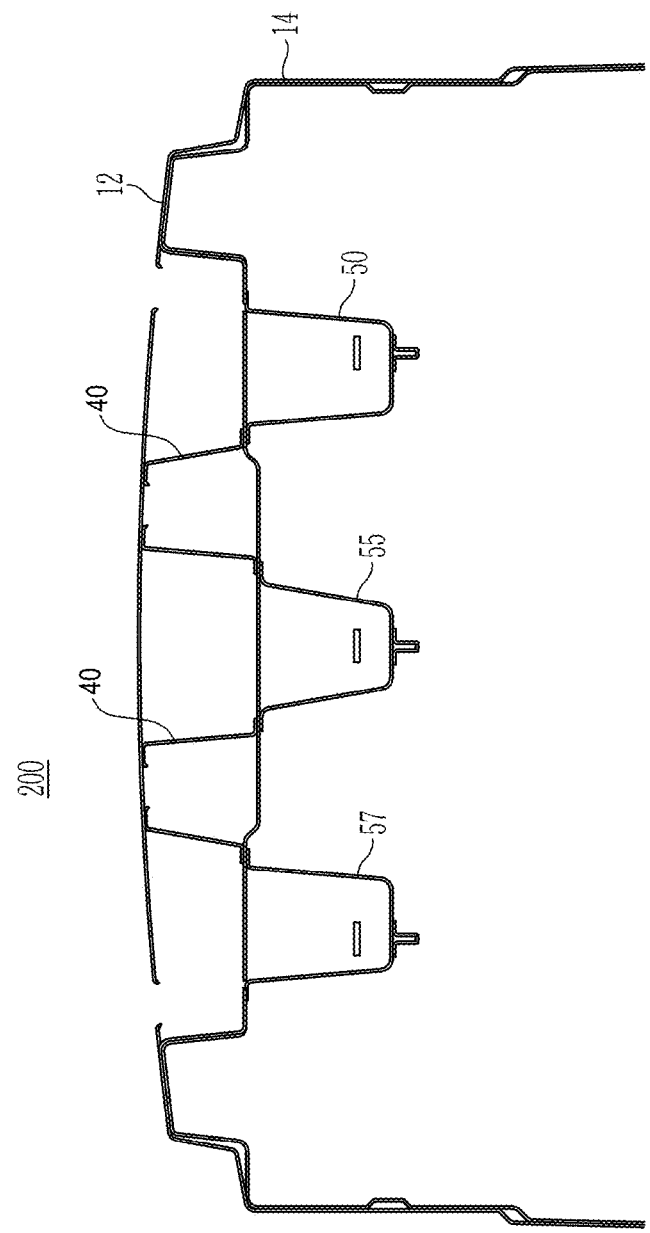
FIG. 12 is a cross-sectional view illustrating a state in which a rear seat belt anchorage structure according to still another embodiment of the present disclosure is provided as a plurality of rear seat belt anchorage structures.

FIG. 11 is a view illustrating a state in which a rear seat belt anchorage structure according to another embodiment of the present disclosure is provided as a plurality of rear seat belt anchorage structures, and FIG. 12 is a cross-sectional view illustrating a state in which a rear seat belt anchorage structure according to still another embodiment of the present disclosure is provided as a plurality of rear seat belt anchorage structures.

With reference to FIGS. 11 and 12, in a rear seat belt anchorage structure 200 according to another embodiment of the present disclosure, the rear seat belt retractor mounting bracket 40 may be provided as a plurality of rear seat belt retractor mounting brackets 40 disposed in the internal space of the rear cross member 5 and provided at positions between the plurality of rear seatback mounting brackets 50, 55, and 57 without overlapping the plurality of rear seatback mounting brackets 50, 55, and 57.

This structure may be a structure in which the plurality of rear seat belt retractor mounting brackets 40 is symmetrically mounted in the direction perpendicular to the longitudinal direction of the vehicle, which may disperse, in a balanced manner, a load applied by the webbing of the rear seat belt.

In addition, the number of rear seat belt retractor mounting brackets 40 and the number of rear seatback mounting brackets 50, 55, and 57 may be variously changed depending on the number of webbings 45 of the rear seat belt and the specifications of the vehicle body, which may disperse and mitigate a load applied by the webbing 45 of the rear seat belt and reinforce the rigidity of the rear opening portion.

According to the embodiments of the present disclosure described above, the rear cross member of the vehicle and organic welding of the BIW may reduce the area of the rear opening portion and improve the durability of the BIW.

In addition, the rear seat belt retractor mounting bracket is mounted by welding in the opening through which the webbing of the rear seat is extended, which may reinforce the strength of the webbing extension opening.

In addition, at least one rear seatback mounting bracket is provided on the rear cross member and protrudes toward the rear seat, such that the 'W'-shaped load dispersion structure may be implemented, which may reinforce the test strength of the seat belt anchorage.

While the exemplary embodiments of the present disclosure have been described, the present disclosure is not limited to the embodiments. The present disclosure covers all modifications that can be easily made from the embodiments of the present disclosure by those skilled in the art and considered as being equivalent to the present disclosure.

The following reference identifiers may be used in connection with the figures in describing various features of embodiments of the present disclosure.

| | |
|---|---|
| 100, 200: Rear seat belt anchorage structure for vehicle | |
| 5: Rear cross member | 10: Front cross member upper panel |
| 12: Side extension panel | 14: Quarter inner panel |
| 20: Front cross member lower panel | 30: Rear cross member panel |
| 32: Rear wiper mounting bracket | 34: Reinforcement |
| 36: Tailgate latch-striker mounting bracket | |
| 40: Rear seat belt retractor mounting bracket | 42: Reinforcement bracket |
| 44: Seat belt pretensioner | 45: Webbing |
| 50, 55, 57: Rear seatback mounting bracket | 54, 56, 58: Bulkhead |
| 52: Rear seatback mounting protrusion | |

What is claimed is:

1. A rear seat belt anchorage structure for a vehicle, the rear seat belt anchorage structure comprising:
   a rear cross member configured to be disposed at a rear side of a rear seat at a rear end of the vehicle, the rear cross member comprising:
      a front cross member upper panel disposed at the rear side of the rear seat at the rear end of the vehicle and extending in a direction perpendicular to a longitudinal direction of the vehicle;
      a front cross member lower panel coupled to a lower portion of the front cross member upper panel; and
      a rear cross member panel coupling the front cross member upper panel and a rear end of the front cross member lower panel in a height direction of the vehicle;
   a rear seat belt retractor mounting bracket disposed on an upper surface of the front cross member upper panel and defining an opening through which a webbing of a rear seat belt extends; and
   a rear seatback mounting bracket disposed on the front cross member upper panel and a front end of the front cross member lower panel and protruding toward the rear seat.

2. The rear seat belt anchorage structure of claim 1, further comprising side extension panels disposed at two opposite ends of the rear cross member panel and configured to be connected to pillars of the vehicle.

3. The rear seat belt anchorage structure of claim 2, further comprising quarter inner panels disposed at two opposite ends of the front cross member lower panel, connected to the side extension panels, and connected to the pillars of the vehicle.

4. The rear seat belt anchorage structure of claim 1, wherein the rear cross member further comprises:
   a reinforcement configured to improve strength of the rear cross member;
   a rear wiper mounting bracket configured to fix a wiper for a rear glass; and
   a tailgate latch-striker mounting bracket configured to fix a tailgate fixing latch and a striker of the vehicle.

5. The rear seat belt anchorage structure of claim 1, wherein the rear seatback mounting bracket has a plate shape having an end bent upward.

6. The rear seat belt anchorage structure of claim 5, wherein the rear seatback mounting bracket has a shape in which a width of the rear seatback mounting bracket gradually decreases toward the rear seat.

7. The rear seat belt anchorage structure of claim 5, wherein an upper portion of the rear seatback mounting bracket is covered by a bulkhead.

8. The rear seat belt anchorage structure of claim 5, further comprising a rear seatback mounting protrusion disposed at a front end of the rear seatback mounting bracket, wherein the rear seat is configured to be fixed to and supported on the rear seatback mounting protrusion.

9. The rear seat belt anchorage structure of claim 1, wherein the rear seatback mounting bracket comprises a plurality of rear seatback mounting brackets, and wherein the rear seat belt retractor mounting bracket comprises a plurality of seat belt retractor mounting brackets disposed at positions between the plurality of rear seatback mounting brackets and symmetrically disposed on an upper surface of the front cross member upper panel.

10. A rear seat belt anchorage structure for a vehicle, the rear seat belt anchorage structure comprising:
    a rear cross member configured to be disposed at a rear side of a rear seat at a rear end of the vehicle, the rear cross member comprising:
       a front cross member upper panel disposed at the rear side of the rear seat at the rear end of the vehicle and extending in a direction perpendicular to a longitudinal direction of the vehicle, the front cross member upper panel comprising a first opening through which a webbing of a rear seat belt extends;
       a front cross member lower panel coupled to a lower portion of the front cross member upper panel; and
       a rear cross member panel coupling the front cross member upper panel and a rear end of the front cross member lower panel in a height direction of the vehicle;
    a rear seat belt retractor mounting bracket disposed on an upper surface of the front cross member upper panel and inserted into the first opening, coupled by welding to an inner surface of the rear cross member panel and an inner surface of the front cross member upper panel, and coupled by welding to an upper surface of the front cross member upper panel outside the first opening; and
    a rear seatback mounting bracket disposed on the front cross member upper panel and a front end of the front cross member lower panel and protruding toward the rear seat.

11. The rear seat belt anchorage structure of claim 10, further comprising a reinforcement bracket disposed on the rear seat belt retractor mounting bracket, configured to connect two opposite ends of the rear seat belt retractor mounting bracket, and having a second opening, corresponding to the first opening, wherein the webbing of the rear seat belt extends through the first opening and the second opening.

12. The rear seat belt anchorage structure of claim 11, further comprising seat belt pretensioners disposed at two opposite sides of the rear seat belt retractor mounting bracket and interposed between the front cross member upper panel and the reinforcement bracket.

13. The rear seat belt anchorage structure of claim 10, further comprising:
    side extension panels disposed at two opposite ends of the rear cross member panel and configured to be connected to pillars of the vehicle; and
    quarter inner panels disposed at two opposite ends of the front cross member lower panel, connected to the side extension panels, and connected to the pillars of the vehicle.

14. The rear seat belt anchorage structure of claim 10, wherein the rear cross member further comprises:
    a reinforcement configured to improve strength of the rear cross member;
    a rear wiper mounting bracket configured to fix a wiper for a rear glass; and
    a tailgate latch-striker mounting bracket configured to fix a tailgate fixing latch and a striker of the vehicle.

15. The rear seat belt anchorage structure of claim 10, wherein the rear seatback mounting bracket has a plate shape having an end bent upward.

16. The rear seat belt anchorage structure of claim 15, wherein the rear seatback mounting bracket has a shape in which a width of the rear seatback mounting bracket gradually decreases toward the rear seat.

17. The rear seat belt anchorage structure of claim 15, further comprising a rear seatback mounting protrusion disposed at a front end of the rear seatback mounting bracket, wherein the rear seat is configured to be fixed to and supported on the rear seatback mounting protrusion.

18. A vehicle comprising:
a vehicle body comprising a roof panel extending in a length direction of the vehicle body and side pillars disposed on opposite sides of the vehicle body and extending in a height direction of the vehicle body;
a rear seat disposed in an interior of the vehicle between the side pillars;
a rear seat belt coupled to the rear seat and configured to restrain an occupant in the rear seat;
a rear cross member disposed at a rear side of the rear seat at a rear end of the vehicle, the rear cross member comprising:
  a front cross member upper panel disposed at the rear side of the rear seat at the rear end of the vehicle body and extending in a width direction of the vehicle body;
  a front cross member lower panel coupled to a lower portion of the front cross member upper panel; and
  a rear cross member panel coupling the front cross member upper panel and a rear end of the front cross member lower panel in the height direction of the vehicle body;
a rear seat belt retractor mounting bracket disposed on an upper surface of the front cross member upper panel and defining an opening through which a webbing of the rear seat belt extends; and
a rear seatback mounting bracket disposed on the front cross member upper panel and a front end of the front cross member lower panel and protruding toward the rear seat.

19. The vehicle of claim 18, further comprising:
side extension upper panels connected to the side pillars disposed on the opposite sides of the vehicle body and to the roof panel at the rear end of the vehicle body, the side extension upper panels extending toward a lower side of the vehicle body;
side extension center panels connected to lower portions of the side extension upper panels and extending toward the lower side of the vehicle body;
side extension lower panels connected to lower portions of the side extension center panels and extending toward the lower side of the vehicle body; and
a back panel connected to lower portions of the side extension lower panels at the opposite sides of the vehicle body and extending in the width direction of the vehicle body.

20. The vehicle of claim 19, further comprising:
a rear glass disposed in an opening between the rear cross member and the roof panel;
a luggage space disposed in an opening between the rear cross member and the back panel;
a tailgate disposed in the luggage space;
a rear wiper mounting bracket disposed on the rear cross member and fixing a wiper for the rear glass;
a tailgate latch-striker mounting bracket disposed on the rear cross member and fixing a tailgate fixing latch and a striker of the vehicle; and
a rear seatback mounting protrusion disposed at a front end of the rear seatback mounting bracket, wherein the rear seat is fixed to and supported on the rear seatback mounting protrusion.

* * * * *